United States Patent [19]

Wong

[11] Patent Number: 5,601,979

[45] Date of Patent: Feb. 11, 1997

[54] PREPASRATION AND USE OF MAGNETIC CONTROLLED PORE GLASS HAVING OLIGONUCLEOTIDES SYNTHESIZED THEREON

[75] Inventor: Yuan N. Wong, Boonton, N.J.

[73] Assignee: CPG, Inc., Lincoln Park, N.J.

[21] Appl. No.: 307,307

[22] Filed: Sep. 16, 1994

Related U.S. Application Data

[63] Continuation-in-part of Ser. No. 794,910, Nov. 20, 1991.

[51] Int. Cl.$^6$ .............. C12Q 1/68; C12Q 1/70; G01N 33/00; C12P 19/34
[52] U.S. Cl. ................ 435/6; 435/5; 435/91.2; 435/91.1; 436/126; 436/127; 536/24.3; 536/24.31; 536/24.32; 536/24.33
[58] Field of Search ................... 435/6, 5, 91.2, 435/91.1, 91.5; 536/24.3–24.33; 436/126, 127

[56] References Cited

U.S. PATENT DOCUMENTS

| | | | |
|---|---|---|---|
| 4,233,169 | 11/1980 | Beall et al. | 252/62.59 |
| 4,264,648 | 4/1981 | Ziolo et al. | 427/128 |
| 4,297,337 | 10/1981 | Mansfield et al. | 424/1 |
| 4,812,512 | 3/1989 | Buendia et al. | 525/54.11 |
| 4,959,463 | 9/1990 | Froehler et al. | 536/27 |
| 5,106,730 | 4/1992 | Van Ness et al. | 435/6 |
| 5,387,510 | 2/1995 | Wu | 435/91.2 |
| 5,472,840 | 12/1995 | Stefano | 435/6 |

Primary Examiner—Stephanie W. Zitomer
Assistant Examiner—Dianne Rees
Attorney, Agent, or Firm—Edward S. Irons

[57] ABSTRACT

A functionalized, magnetic controlled pore glass support useful in solid phase DNA synthesis is described. The support acts as a universal solid phase for direct oligonucleotide synthesis. The oligonucleotide bound MPG is useful directly to isolate or purify oligonucleotides which possess a section of complementary sequences.

15 Claims, 5 Drawing Sheets

PREPASRATION AND USE OF MAGNETIC CONTROLLED PORE GLASS HAVING OLIGONUCLEOTIDES SYNTHESIZED THEREON

This application is a continuation-in-part of application Ser. No. 07/794,910 filed Nov. 20, 1991.

TECHNICAL FIELD

This invention provides magnetic controlled pore glass which has an oligonucleotide directly synthesized thereon. The bound oligonucleotide magnetic porous glass may be utilized to isolate any desired oligonucleotide sequence.

DEFINITIONS

For the purpose of this application:

1. "Porous inorganic material" means any porous inorganic material, including but not limited to porous glass, porous silica gel and porous alumina.
2. "Magnetic material" means a transition metal oxide having ferrospinel structure and comprising trivalent and divalent cations of the same or different transitional metals, for example, iron oxide $Fe_3O_4$.
3. "Superparamagnetism" means the magnetic behavior exhibited by the materials which respond to a magnetic field without resultant permanent magnetization.
4. "Colloidal magnetic particles" means finely divided magnetic materials of submicron size, usually 50–250 Angstroms. Such particles may be present in combination with a carrier liquid. A surfactant material may be dispersed throughout the carrier liquid.
5. "CPG" means controlled pore glass.
6. "MPG" means magnetic CPG.
7. Functionalized MPG means MPG, the surface of which has been modified to provide functional groups such as hydroxyl (—OH) and primary amine (—NH$_2$) groups. For example, glyceryl MPG, hydroxyl MPG, long chain amino MPG and amino propyl MPG are commercially available from CPG, Inc., 3 Borinski Road, Lincoln Park, N.J. 07035. Synthesis of such products is described in application Ser. No. 07/794,910.

BACKGROUND OF THE INVENTION

Conventional oligonucleotide synthesis entails first binding the protected 3' terminal nucleotide to a solid support by a succinate ester linkage. The oligonucleotide is extended from the 3' end by the addition of an appropriate sequence of additional protected bases. This process yields an oligonucleotide bound to the support at its 3' end and which has a 5' functional group such as an amine or a thiol group. The oligonucleotide is then deprotected, which results in cleavage from the support, and then purified. The purified oligonucleotide is then immobilized at the 5' end to a second solid support.

Thus, the result of conventional solid phase DNA synthesis is an oligomer immobilized at the 5' end.

SUMMARY OF THE INVENTION

To preclude cleavage of the 3' linked oligomer concurrently with deprotection, this invention utilizes a phosphodiester linkage instead of a succinate ester linkage to bind the protected synthetic oligomer to functionalized MPG thus permitting deprotection with minimal or no cleavage to yield a 3' bound, deprotected oligomer useful directly, e.g., for the isolation or identification of complementary oligomers. Specifically, the hydroxyl groups of appropriately functionalized MPG form a phosphodiester

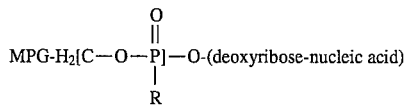

with the conventional phosphoramidite reagent used in polynucleotide synthesis. This linkage is not cleaved by deprotection reagents such as DBU (1,8-diazabicyclo[5-4-0]undec-7-ene) or AMA (50% ammonium hydroxide and 50% methylamine mixture).

DETAILED DESCRIPTION OF THE INVENTION

Preparation of Functionalized Magnetic Porous Supports

Figure 1:
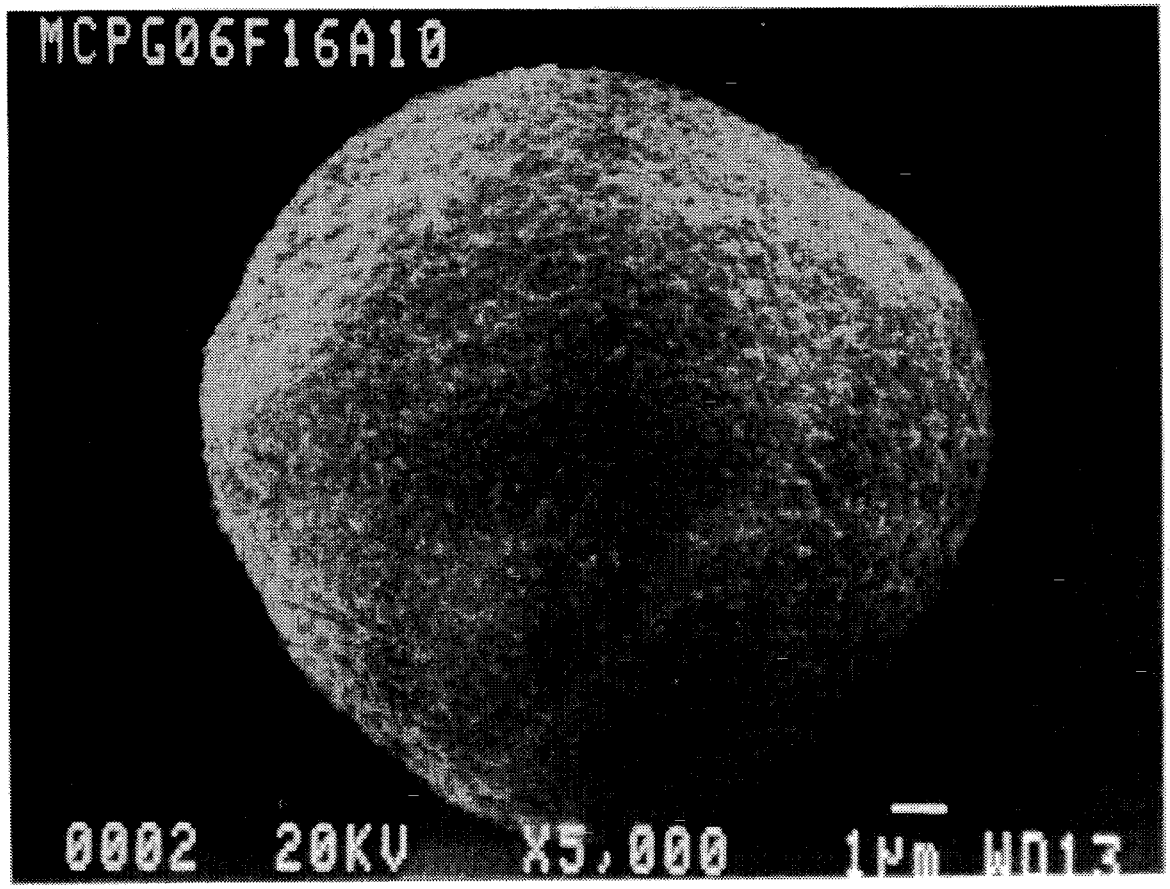
FIG. 1 is a scanning electron microscopic image of an MPG particle, 30–40 microns in size having 3000 Å pores.
Figure 2:
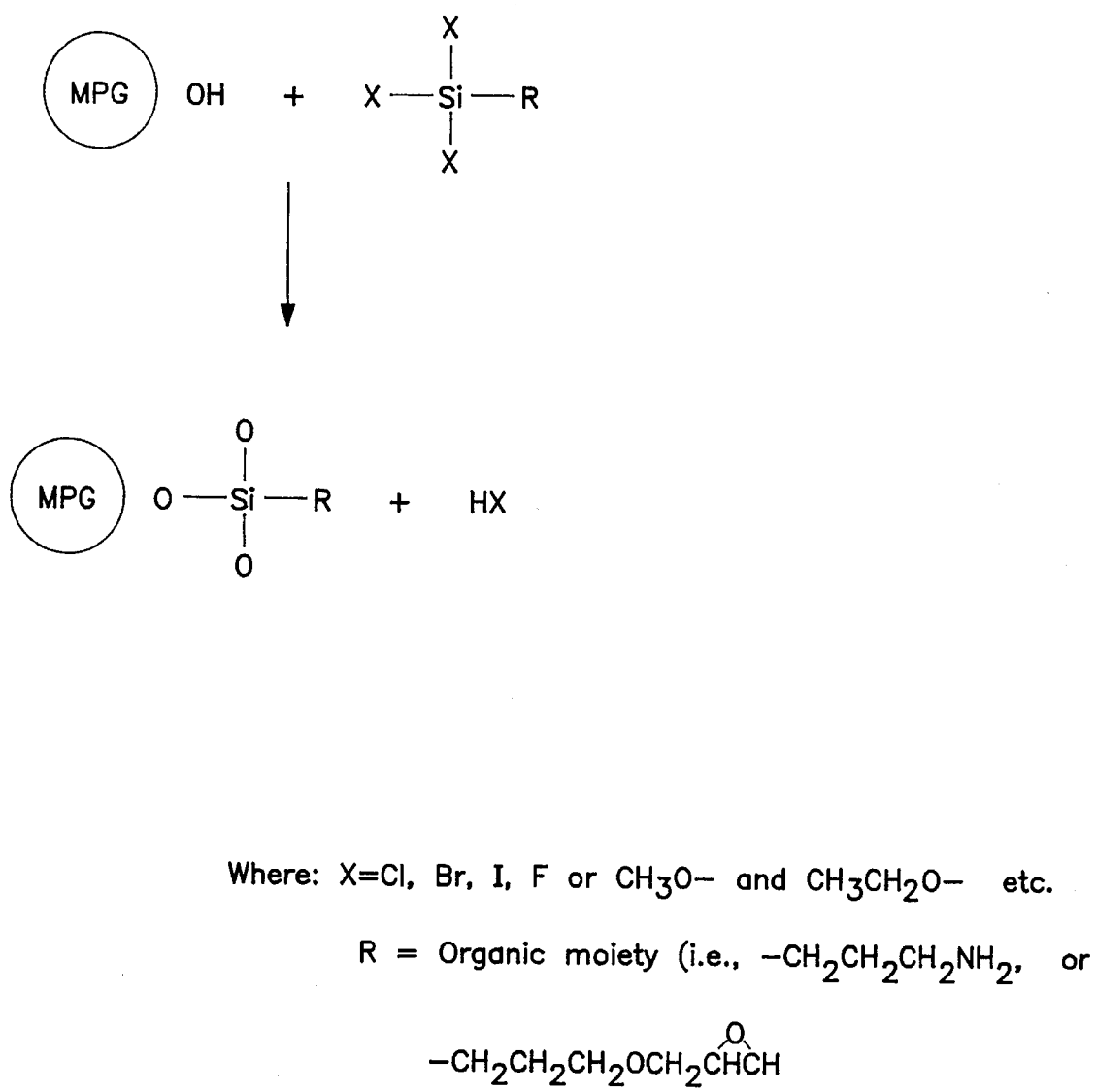
FIG. 2 illustrates some steps of one method useful to functionalize magnetic controlled pore glass.
Figure 3:
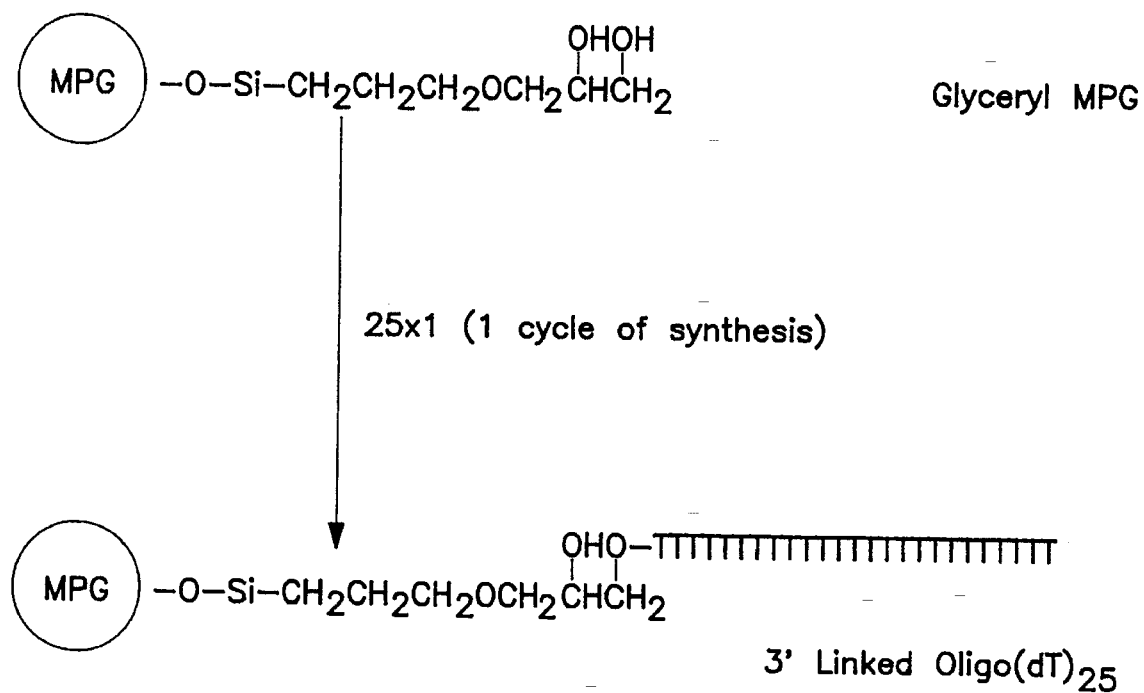
FIG. 3 illustrates the synthesis of poly $(dT)_{25}$ directly on hydroxyl magnetic controlled pore glass.

The production of CPG is described in U.S. Pat. Nos. 3,549,524 and 3,758,284.

MPG may be produced by adding magnetic metallic particles such as iron oxide, preferably as an aqueous colloidal suspension to an aqueous slurry of the inorganic material, agitation of the mixture, removal of excess magnetic particles, and drying the product as described in application Ser. No. 07/794,910 which also describes MPG silanization. For example, MPG may be silanized with silanes of the formula R—Si—X, where R represents an organic moiety with a terminal functional group such as an amino, hydroxyl, epoxy, aldehyde, sulfhydryl, phenyl, long chain alkyl or other group that will chemically react or physically absorb with the biological molecules and X may be a mono-, di-or trialkoxy or halide group which will react with the silanol groups on the surface of the siliceous inorganic material.

Silanization is appropriately accomplished by agitation of magnetic porous support particles at a temperature of 80° to 100° C. in a solution of an appropriate silane in a hydrocarbon solvent such as dry toluene, xylene, benzene, heptane, or nonane, washing with methanol to remove excess silane, and baking for 4 to 10 hours at 80° C. to 100° C. Silanized MPG is then hydrolyzed or otherwise treated to provide free hydroxyl amines or other functional groups.

Representative useful silanes include but are not limited to gamma-aminopropyltrimethoxysilane, 6-(aminohexylaminopropyl)trimethoxy silane, 3-glycidoxypropyltrimethoxysilane, 3-iodopropyltrimethoxysilane, 3-isocyanatopropyltrimethoxysilane, 1-trimethoxysilyl-2-(p,m-chloromethylphenyl)ethane, aminoundecyltrimethoxysilane, p-aminophenyltrimethoxysilane, 4-aminobutyltrimethoxysilane, (aminotheylaminoethyl)-phenyltrimethoxysilane, and mercaptopropyltrimethoxysilane.

For example, MPG may be first silanized with 3-glycidoxypropyltrimethoxysilane. The silanization product is then hydrolyzed with acid to form glycerol groups on the surface of MPG. The glyceryl-MPG product is then directly used for DNA synthesis.

Oligonucleotide Synthesis Utilizing Supports of the Invention

A desired oligonucleotide sequence is programmed into an automatic synthesizer containing a functionalized MPG support. The synthesizer yields a protected oligonucleotide of the desired sequence bound 3' to the MPG. Thereafter, the bound, protected oligonucleotide is deprotected, for example, by treatment with ammonium hydroxide-methyl amine mixture or 1,8-diazabicyclo[5-4-0]undec-7-ene (DBU) in methanol at 55° C. for ten to sixty minutes. This step removes all protective groups from nitrogen atoms in the bases as well as the phosphorus atoms of the phosphate backbone in the oligonucleotides. The 3' bound deprotected oligonucleotide is magnetically separated from the deprotection reaction mixture. It is useful directly, e.g., to isolate its complementary counterpart. For example, MPG-oligo(dT) is useful directly to purify polyadenylated mRNA from cell lysates and homogenized, solid tissues of animals and plants.

Similarly, a 3' bound heterooligonucleotide, i.e., any sequence of four bases, has unlimited application in the identification and isolation of a complementary sequence.

EXEMPLIFICATION OF THE INVENTION

EXAMPLE I

Preparation of Magnetic Porous Inorganic Material With Ferrofluid Colloidal Particles 5 gm of controlled pore glass (CPG, pore diameter of 3000 Angstrom, 37–77 microns) was added to a 70 ml container containing 50 ml of deionized water. To the glass slurry, 1 ml of Ferrofluid colloidal iron oxide (Ferrofluidics Corp.) was added. The Ferrofluid contained 1 to 3% by volume superparamagnetic 100A iron oxide particles in an aqueous medium. The container was placed in the shaker and gently shaken for 24 hours. The glass particles turned into dark brown color. Excessive Ferrofluid was decanted off after the glass settling down. After five washes with water, one wash with 1.5M NaCl solution, three more water washes and three more methanol washes, the magnetic controlled porous glass (magnetic CPG) was then filtered and dried at 90° C. for eight hours. The final product was attracted by laboratory permanent magnet.

Physical characteristics of the magnetic controlled porous glass (magnetic CPG) product were checked by microscopic examination. Pore morphology was determined by porosimeter and surface area analyzer. Under the microscope, the appearance of the magnetic CPG was the same as the regular porous glass except that the magnetic CPG particle was of a uniform brown color. The porosity data for both before and after coating magnetic particles are listed in Table I. Specific pore volume was decreased as expected, because part of the pore volume was occupied by the colloidal iron oxide particles. The increase in the surface area is due to the existence of colloidal particles.

TABLE I

Porosity Data For Glass Particles Before and After Coating With Magnetic Colloidal Particles

|  | Before Coating | After Coating |
| --- | --- | --- |
| Mean pore dia. (A) | 3000 | 3000 |
| Specific pore vol. (cc/gm) | 0.89 | 0.84 |
| Pore diam. distribution (%) | 8.4 | 6.9 |
| Surface area (M2/gm) | 7.4 | 8.97 |
| Lot No. | 11C24 | 081783-2 |

EXAMPLE II

Epoxide Functionalization of Magnetic Controlled Pore Glass 5 gm of dried magnetic CPG prepared as described by Example I was placed in a three neck round bottom flask. 150 ml of 10% 3-glycidoxypropyltrimethoxysilane in dry toluene was added to the flask. The slurry was gently stirred under refluxing condition for 24 hours and then washed with methanol and acetone to remove excessive silane, filtered and baked in the oven at 100° C. for 24 hours in a fume hood. Quantification by titration demonstrated 42 micromoles of epoxy groups per gram of solid.

EXAMPLE III

Hydroxyl Functionalization of MPG 5 gram of magnetic epoxide MPG prepared in Example II was placed in a 150 ml 3 necks round bottle flask. To the magnetic epoxide CPG particles, 100 ml of 0.2M sodium periodate (NaIO$_4$) pH 2.2 (titrated with 3M periodic acid was added. The slurry was stirred gently at 40° C. for six hours. At the end of the reaction, the particles were washed with 10×100 ml deionized water. 500 mg of sodium cyanoborohydride was added to the 100 ml MPG slurry. The reaction was allowed to proceed for three hours. Then the particles were washed with 7×100 ml deionized water, 1×100 ml acetone and filtered. The glass was dried under vacuum overnight. Quantification by titration demonstrated 28 umole of hydroxyl groups per gram.

EXAMPLE IV

Stability of Phosphodiester Bond vs Succinate Ester Bond Under Alkali Treatment 35 mg (~1 umole) of magnetic hydroxyl MPG from Example III was packed in a DNA reaction column of a commercial DNA synthesizer programmed to provide the 20 mer sequence ACC/GCT/GGG/TTC/TTT/TAC/AA (SEQ ID NO. 1) was programmed with the dimethoxytrityl group leaving on the oligonucleotide. Regular dC-CPG (nucleoside-CPG) was also packed in a like DNA reaction column. The same sequence was used to prepare oligonucleotide bound CPG. The 21 mer bound the MPG and CPG particles (~10 MG) were treated with ammonium hydroxide and DBU (1,8-diazabicyclo[5,4,0]undec-7-ene) in like manner under various conditions.

At the end of the treatment, the particles were washed with 3×10 ml of dichloromethane and then dried under vacuum for half an hour, weighed and placed into a graduated test tube. 5 ml of 3% sodium toluenesulfonic acid was added and the supernatant was measured in a spectrophotometer at the wavelength of 504 nm to quantify the anion of dimethoxytrityl groups (DMTr). The low quantity or absence of the DMTr group indicated the cleavage of the oligonucleotides during the treatment. The results in Table I clearly show the phosphodiester bond achieved by this invention is much stronger than the conventional succinate ester bond.

TABLE II

Stability of Phosphodiester Bond vs. Succinate Ester Bond

| Treatment Condition | (umole/g) Oligonucleotide Bound on | |
|---|---|---|
| | Glyceryl-MPG (Phosphodiester bond) | Nucleoside CPG (Succinate ester bond) |
| 25% ammonium hydroxide aqueous solution, @ 55° C. for 15 minutes | 9.0 | 0.2 |
| 10% DBU in acetonitrile @ 55° C. for one hour | 20.6 | 4.41 |
| 100% DBU @ 55° C. for one hour | 20.8 | 5.01 |

EXAMPLE V

Synthesis of 33 mer of Poly(dT) on Magnetic Glyceral CPG 35 mg (~1 umole) of magnetic hydroxyl MPG from Example IV was packed in a DNA synthesis column. The column was placed in an ABI 381A synthesizer to chemically synthesize an oligonucleotide with a sequence of poly(dT)$_{33}$. Each step in the synthesis was monitored by measuring the amounts of dimethoxytrityl group removed, in the spectrophotometer. In this test, the stepwise yield was in the range of 97–99.5% and the overall yield is 98.3%. At the end of synthesis, particles were transferred to a 1.5 ml microcentrifuge vial. 1 ml of 2% of 1,8-diazabicyclo[5-4-0]undec-7-ene(DBU) in acetonitrile was added. The vial was rotated gently at ambient temperature for 1 hour to remove the protective groups of the phosphate molecules. At the end of the reaction, the particles were washed with 3×10 ml acetonitrile, 3×10 methanol and 3×10 ml dichloromethane. The particles [3'linked Oligo(dT)$_{33}$] were dried overnight under the vacuum. The synthesis is illustrated by FIG. 4.

EXAMPLE VI

Figure 4:
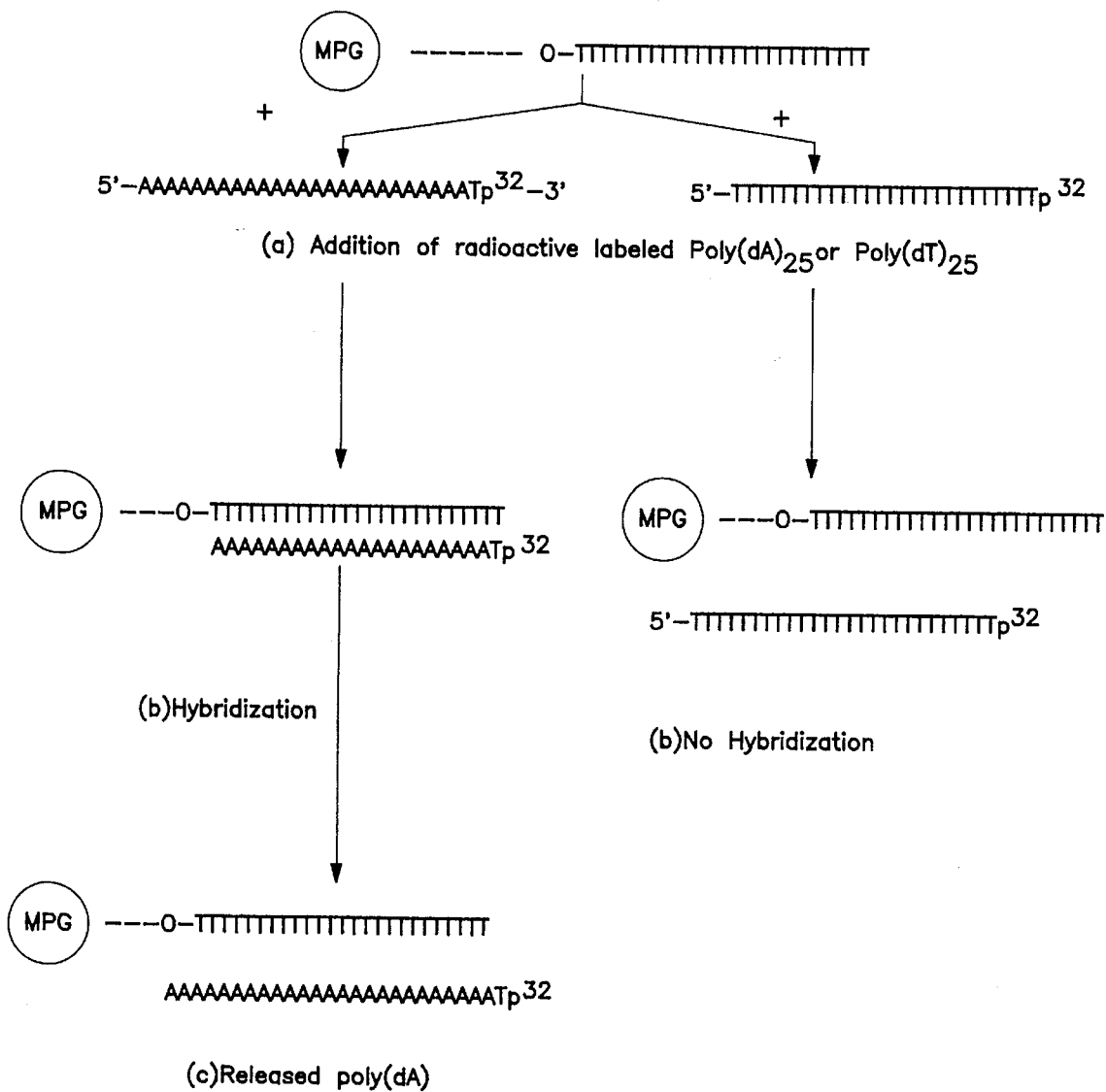
FIG. 4 illustrates the isolation of poly$(dA)_{25}$ with 3' linked oligo$(dT)_{25}$ as illustrated by FIG. 3.
Figure 5:
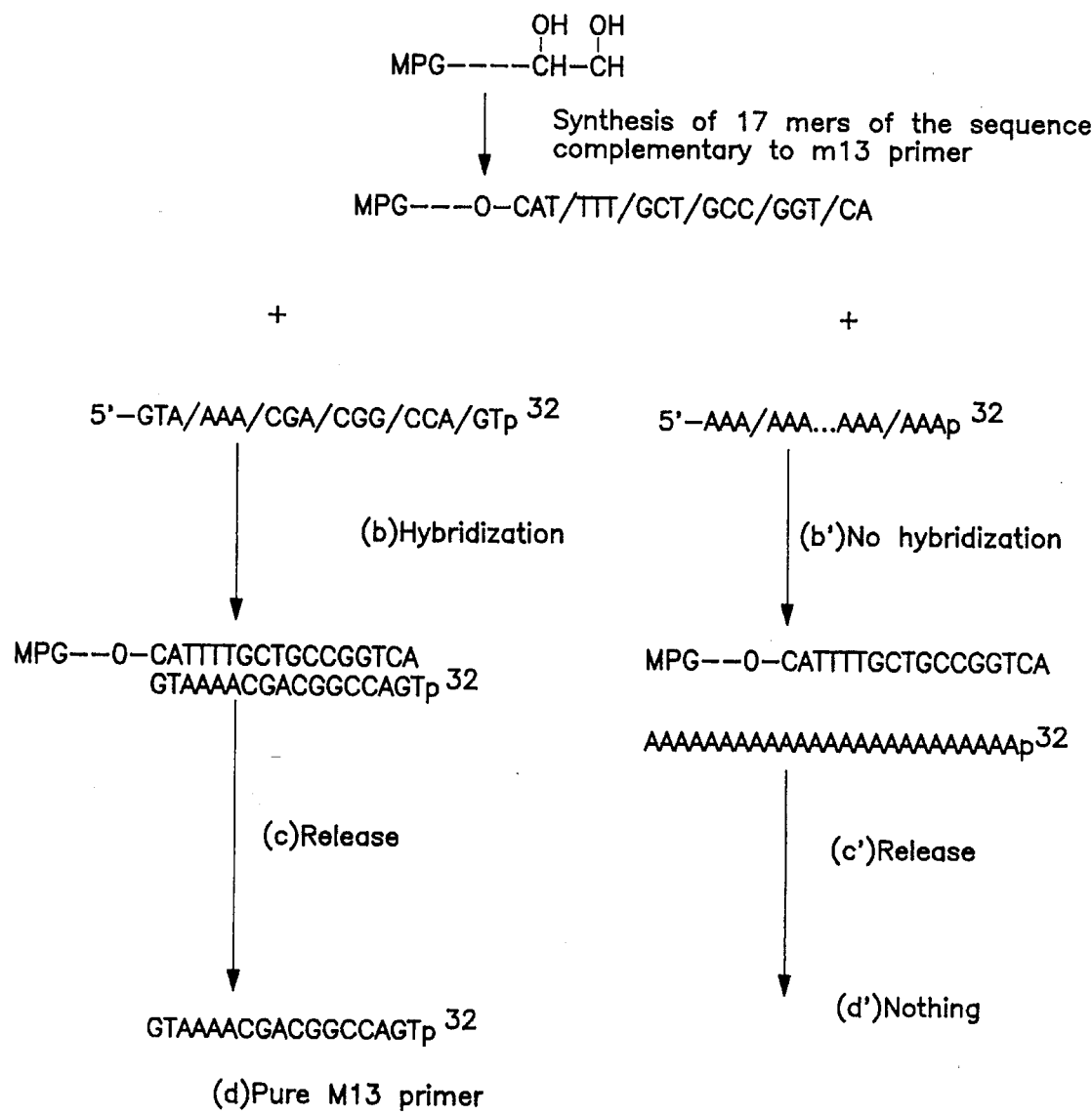
FIG. 5 illustrates the isolation of primer M13 with its complementary oligonucleotide synthesized on glyceryl MPG.

Comparison of Example V Product With Commercial 5' Linked Oligo(dT)$_{25}$ Polystyrene The 3'linked oligo(dT)$_{33}$ MPG of Example V and commercially available 5'linked oligo(dT)$_{25}$ magnetic polystyrene particles (Dynal Oligo(dT)$_{25}$ bead available from Dynal, Inc., 475 Northern Boulevard, Great Neck, N.Y. were tested for hybridization/release capacity as illustrated by FIG. 4. The specific binding probe was a radioactive labeled complementary oligonucleotide (i.e., a poly(DA)$_{25}$ oligomer incorporated with dATP$^{32}$ at 3'end with terminal transferase enzyme). The conditions for binding and elution were done according to the protocol of Dynal Oligo(dT) bead. In brief, 50 pmole of the poly(dA)$_{25}$ probe (a mixture of radioactive and non-radioactive in a ratio of 1:1000) was added to 0.5 mg magnetic particles in binding buffer (40 mM Tris buffer, pH=7.5, 2M LiCl, 1 4 mM EDTA). The mixture was rotated at room temperature for 5 minutes. At the end of hybridization, the particles were magnetically separated from solution and supernatant was removed by aspiration. The particles were then washed with washing buffer (10 mM Tris, pH=7.5, 0.15 mM LiCl, 1 mM EDTA) twice. To release the bound probe, the particles were resuspended in elution solution (2 mM EDTA) and heat at 65° C. for 2 minutes. The supernatant was magnetically separated from the parties. Both the supernatant and particles were counted separately to obtain the release capacity and non-specific binding capacity.

To confirm that hybridization, rather than non-specific binding did occur, poly(dT)$_{25}$-P$^{32}$ was used as a probe to re-run the same test. Since this probe does not hybridize with the poly(dT)$_{33}$ bound MPG, no binding should be expected except for non-specific binding. Their results are shown in Table III.

TABLE III

Hybridization and Release of Poly(dA)$_{25}$-P$^{32}$ on MPG Oligo-dT33 And Dynabead Oligo (dt)25 Bound Magnetic Particles

| Probe | MPG Oligo-(dT)$_{33}$ | Dynabead Oligo-(dT)$_{25}$ |
|---|---|---|
| dA$_{25}$-P$^{32}$ | | |
| % of Release (CPM) | 5.58 | 9.20 |
| % Remain in Solid (CPM) * | 1.17 | 1.07 |
| dT$_{25}$-P$^{32}$ | | |
| % of Release (CPM) | trace | trace |
| % Remain in Solid (CPM) * | 0.08 | 0.92 |

* Non-specific adhesion to solid

EXAMPLE VII

Synthesis of Poly(dT)$_{25}$ With Various Lengths of Poly(dC)$_x$ as Space Arms And Their Use For Isolation of Poly(dA)$_{25}$ 30 mg (~1 umole) of magnetic glyceryl MPG from Example III was packed in a DNA synthesis column. The column was placed in an ABI 381A synthesizer to chemically synthesize oligonucleotides with the sequences of poly(dT)$_{25}$ and various length of poly(dC)$_x$ (where x is 8, 16 and 24). Each step in the synthesis was monitored by measuring the amounts dimethoxytrityl group removed in the spectrophotometer. In this test, the stepwise yield was 98–99% and the overall yields were: 98.8%, 98.7% and 98.6% respectively. At the end of synthesis, the particles were transferred to a 1.5 ml microcentrifuge vial. 1 ml of 2% of [1,8-diazabicyclo[5]4]0]-undec-7-ene (DBU) in acetonitrile was added. The vial was rotated gently at ambient temperature for 1 hour to remove the protective groups of the phosphate molecules. The isolation of poly(dT)$_{25}$ was accomplished as described in Example V. The results of the test are illustrated in Table IV.

TABLE IV

Hybridization and Release Of Poly(dA)$_{25}$-P$^{32}$ on Oligo-dT$_{25}$ Magnetic Particles with Various Spacer(dC)$_x$

| Solid | % of Release | % Remain in Particles |
|---|---|---|
| 3' linked MPG-Oligo(dC)$_8$- (dT)$_{25}$ | 2.30 | 0.61 |
| 3' linked MPG-Oligo(dC)$_{16}$- (dT)$_{25}$ | 7.08 | 1.80 |
| 3' linked MPG-Oligo(dC)$_{24}$- (dT)$_{25}$ | 5.96 | 1.29 |
| 5' linked Dynal-Oligo(dT)$_{25}$ | 9.20 | 1.07 |

EXAMPLE VIII

Isolation of mRNA from Mouse Liver Tissue by 3' Linked Oligo(dT)$_{25}$ with Various Spacer (dC)$_x$ 1 mg of each sample from Example VII was suspended individually in a 1.5 ml microcentrifuge tube. To each tube, 100 ul of 1M KCl was added. The tube was vortexed to fully suspend the particles. The particles were magnetically separated with a magnetic particle separator and the supernatant was carefully removed with a pipette. The washing steps were repeated two more times. The particle samples were resuspended in 100 ul of tissue extract/hybridization buffer (100 mM Tris-HCl, pH=8.0, 500 mM LiCl, 10 mM EDTA, 1% LIDS, 5 mM DTT) and set aside for hybridization. 2 ml of tissue extraction/hybridization buffer was added to a 50 ml screw cap conical tube. The tare weight of the tube was recorded. The liver from a sacrificed mouse was removed and transferred to the 50 ml tube containing the tissue extraction/hybridization buffer. The liver was homogenized with a mini-homogenizer. The weight of the tube plus homogenized liver tissue was recorded. The tare weight of the tube was subtracted to obtain the tissue weight. The tissue homogenate was transferred to 1.5 ml microcentrifuge tube and centrifuged at 10,000 RPM for one to two minutes. The proper volume, which was equivalent to 0.1 gm tissue to each tube containing the particles set aside for hybridization were transferred. The well was vortexed, incubated for five minutes at room temperature and magnetically separated. The supernatant was carefully removed. The particles were resuspended in 1 ml washing buffer (10 mM Tris-HCl, pH=8.0, 150 mM LiCl, 1 mM EDTA, 0.1% LIDS). The supernatant was magnetically separated and carefully removed. This process was repeated two more times. The particles were resuspended in 20 ul release solution (2 mM EDTA, pH=8.0) and heated at 65° C. for two minutes. The supernatant (which now contained isolated mRNA) was magnetically separated and carefully transferred to a semi-micro cuvette, and diluted with 500 ul of release solution. The solution was read at both 260 and 280 nm wavelength in a spectrophotometer. A comparative experiment in which 5' linked streptavidin/biotin/oligo(dT)$_{25}$ was also conducted (Dynabeads M280 streptavidin coupled to Oligo(dT)$_{25}$. The results of the test are illustrated in Table V.

TABLE V

Isolation of mRNA from Mouse Liver with 3' Linked Oligo(dT)$_{25}$ With Various Spacer (dC)$_x$

| Solid | Yield* (ug/mg) | Purity** |
|---|---|---|
| 3'linked MPG-Oligo(dC)$_{8^+}$ (dT)$_{25}$ | 1.31 | 1.57 |
| 3'linked MPG-Oligo(dC)$_{16^+}$ (dT)$_{25}$ | 3.49 | 1.64 |
| 3'linked MPG-Oligo(dC)$_{24^+}$ (dT)$_{25}$ | 6.68 | 1.78 |
| 3'linked MPG-Oligo(dT)$_{33}$ | 1.17 | 1.44 |
| 5'linked Streptavidin/biotin-Oligo(dT)$_{25}$ | 6.12 | 2.10 |

*Yield = 45 × (OD)$_{260}$
**Purity = (OD)$_{260}$/(OD)$_{280}$

EXAMPLE IX

Synthesis of 17 mer Oligonucleotide Having Sequence of 3'-CAT/TTT/GCT/GCC/GGT/CA 5' (SEQ ID NO. 2) on MGLY and its Use for Isolation of M13 Primer 25 mg (1 umole) of magnetic hydroxyl CPG from Example III was packed in a DNA synthesis column. The column was placed in a DNA synthesizer (ABI Model 381A) programmed to yield SEQ ID NO. 2. UltraFast* acetyl protection of dC monomer and other three monomers with conventional protection phosphoramidites (benzoyl for dA, isobutylryl for dG and none for dT) were used in the synthesis. At the end of synthesis, the magnetic particles were transferred into a microcentrifuge vial (1.5 ml) for protective groups removal. 0.25 ml of AMA (i.e., 50:50 mixture of aqueous ammonium hydroxide and aqueous methylamine) was added to the vial. The particles suspension was incubated at room temperature for 5 minute and then at 55° C. for 10 minutes. The magnetic particles were then washed with 10×1.5 ml methanol, 3×1 ml dichloromethane and dried under vacuum overnight.

0.1 pmole of M13 primer (5'-GTA/AAA/CGA/CGG/CCA/GT-3'), SEQ ID. NO:3, purchased from Oligo Therapeutic Inc., 9775 SW Commerce Circle, Bldg. C-6, Wilsonville, Oreg. and 0.1 pmole of poly(dA)$_{25}$ labeled with dATP$^{32}$ at 3'end with terminal transferase were added to 0.1 mg of the above oligonucleotide bound magnetic particles suspended in 1 ml hybridization solution (0.5M NaCl). The particles suspension was allowed to rotate at ambient temperature for 5 minutes. At the end of hybridization, the particles were magnetically separated and the supernatant was removed by aspiration. 1 ml of wash solution (2M NaCl) was added to the particles and shaken vigorously. The particles solution was again magnetically separated to remove the supernatant. Repeat the washing cycles two more times. To release the M13 primer, the particles were resuspended in 1 ml of the elution solution (2 mM EDTA) and heated at 65° C. for 2 minutes. The supernatant was magnetically separated from the particles and both were counted separately to obtain the release capacity as well as the non-specific binding capacity.

*UltraFAST reagent (acetyl-dC), benoyl-dA, isobutylryl-dG can be deprotected in 10 minutes at 55° C. with AMA. This deprotection system is available from Beckman Instruments, 8920, Route 108, Columbia, Md. 21045.

TABLE VI

Isolation of M13 Primer by its Complementary
Oligonucleotide Bound on Magnetic Controlled Pored Glass

| Oligomer-$P^{32}$ | % of Release | % Remain in Particles |
|---|---|---|
| M13 Primer (specific) | 10.64 | 0.12 |
| Poly(dA)$_{25}$(non-specific) | 0.79 | 0.49 |

This example demonstrates (1) synthesis of a preselected base sequence directly on functionalized MPG (glyceral MPG), (2) that the bound oligo survives the deblocking step, and (3) that the bound oligo is fully deprotected and is directly useful to isolate (hybridize and release) its complementary oligo in solution.

EXAMPLE X

Preparation of Streptavidin-MPG With Glyceryl-MPG 1 gm dry Glyceryl MPG (MGLY) prepared in Example VII was wetted with 45 ml deionized water and sonicated for a few second to ensure no aggregate in the suspension. The wet magnetic particles were activated with 0.2M sodium meta-periodate for 1.5 hour at room temperature. At the end of the reaction, the particles were washed ten times with 40 ml deionized water. The Streptavidin solution was prepared by adding 200 mg streptavidin to 10 ml of 0.1M phosphate buffer, pH=7.40 (coupling buffer). The protein solution was added along with 0.1 g of sodium cyanoborohydride to the activated MGLY particles. The particles and protein solution was allowed to tumble overnight at room temperature on a low speed rotator. Excess protein solution was removed and the particles were washed once with 40 ml coupling buffer. The efficiency of protein coupling was determined by the difference of two protein concentrations (reading at 280 nm in a spectrophotometer before and after the reaction). In order to cap the unreacted site, 10 ml of coupling buffer containing 3.76 gm of glycine and 0.1 gm sodium cyanoborohydride was added to the particles. The reaction mixture was again allowed to tumble for another three hours at room temperature. At the end of the reaction, the particles were washed once with 40 ml coupling buffer, three times with 40 ml PBS (0.01M phosphate+1.5M NaCl, pH=7.40), and three times with 40 ml deionized water and twice with 40 ml of storage buffer (PBS+) 0.1% bovine serum albumin+0.02% sodium azide).

BIBLIOGRAPHY

1. Matteucci, M. D., et al., *J.Am. Chem. Soc.* 103:3185–3191 (1981).
2. Adams, S. P., et al. *J.Am. Chem. Soc.* 105:661–663 (1983).
3. "Oigonucleotide Synthesis—A Practical Approach" edited by Gait M. J., IRL Press Ltd., Oxford, England (1984).
4. Sproat D. S., et al. *Nucleic Acids Research* 13:2979–2987 (1985).

---

I claim:
1. A process which comprises:
(i) providing a particulate, functionalized magnetic porous glass,
(ii) providing a first protected nucleoside,
(iii) covalently attaching said first protected nucleoside 3' to said particulate, functionalized magnetic porous glass,
(iv) covalently attaching a sequence of protected nucleosides to said first protected nucleoside to provide a protected nucleotide sequence attached 3' to said particulate, functionalized magnetic porous glass, and
(v) deprotecting said protected nucleotide sequence attached to said particulate, functionalized magnetic porous glass wherein said deprotection step (v) yields an unprotected oligonucleotide sequence bound 3' to said particulate, functionalized magnetic porous glass which may be hybridized directly to an oligonucleotide having a complementary sequence.

2. A process which comprises:
(i) providing a particulate, functionalized magnetic porous glass,
(ii) providing a first protected nucleoside,
(iii) covalently attaching said first protected nucleoside 3' to said particulate, functionalized magnetic porous glass,
(iv) covalently attaching a sequence of protected nucleosides to said first protected nucleoside to provide a protected nucleotide sequence attached 3' to said particulate, functionalized magnetic porous glass,
(v) deprotecting said protected nucleotide sequence attached to said particulate, functionalized magnetic porous glass, and
(vi) magnetically separating said deprotected nucleotide sequence from said deprotection reaction mixture, wherein said step (v) yields an unprotected oligonucleotide bound 3' to said particulate, functionalized magnetic porous glass which may be hybridized directly to an oligonucleotide having a complementary sequence.

3. The process of claim 2 wherein said particulate, functionalized magnetic porous glass has the schematic formula MPG—Si—O—R—Y, in which MPG is magnetic porous glass, R is a straight chain or cyclic spacer having 5 to 20 carbon, hydrogen or oxygen atoms, and Y is —CH$_2$OH or —NH$_2$.

4. The process of claim 2 in which the spacer R is —(CH$_2$)$_x$ and in which X is 5 to 20.

5. An unprotected first oligonucleotide bound 3' to particulate magnetic porous glass having a second oligonucleotide having a complementary sequence hybridized thereto.

6. A method which comprises:
(i) providing an unprotected first oligonucleotide bound 3' to particulate magnetic porous glass;
(ii) providing a sample containing at least one oligonucleotide which may or may not have a sequence complementary to said first oligonucleotide;
(iii) combining said first oligonucleotide with said sample under conditions appropriate to cause hybridization of said first oligonucleotide with an oligonucleotide present in said sample having a sequence complementary to said first oligonucleotide hybridized with said sequences of said oligonucleotide present in said sample;
(iv) determining whether hybridization occurs between said first oligonucleotide and an oligonucleotide present in said sample.

7. A method which comprises:
(i) providing an unprotected first oligonucleotide bound 3' to particulate magnetic porous glass;
(ii) providing a sample containing (a) an oligonucleotide having a sequence complementary to said first oligonucleotide and (b) another material;
(iii) contacting said first oligonucleotide with said sample under reaction conditions appropriate to cause said first oligonucleotide to form a hybrid with said sequence of said oligonucleotide present in said sample which is complementary to said first oligonucleotide;
(iv) magnetically separating said hybrid formed in step (ii) from the hybridization reaction mixture in which it is formed;
(v) denaturing said hybrid formed in step (iv); and (vi) recovering said oligonucleotide having a sequence complementary to said first oligonucleotide from the denaturing reaction mixture formed in step (v).

8. A method which comprises:
(i) providing a sample which contains polyadenylated mRNA;
(ii) reacting said sample with unprotected poly(dT) bound 3' to magnetic porous glass under conditions appropriate to hybridize said polyadenylated mRNA with said poly(dT) bound 3' to magnetic porous glass;
(iii) magnetically separating the hybrid so produced from the hybridization reaction mixture; and
(iv) denaturing said hybrid to produce a mixture of polyadenylated mRNA and said unprotected poly(dT) bound 3' to magnetic porous glass; and
(v) recovering said polyadenylated mRNA from said mixture.

9. A method which comprises:
(i) activating wet glyceryl-MPG particles by treatment with aqueous sodium meta-periodate;
(ii) coupling streptavidin to the activated glyceryl-MPG particles produced in step (i); and
(iii) recovering the streptavidin coupled mPG produced in step (ii).

10. The claim 1 process wherein a phosphodiester linkage is utilized in step (iii) for covalently attaching said first protected nucleoside 3' to said particulate, functionalized magnetic porous glass.

11. The claim 2 process wherein a phosphodiester linkage is utilized in step (iii) for covalently attaching said first protected nucleoside 3' to said particulate, functionalized magnetic porous glass.

12. Particulate functionalized magnetic porous glass having an unprotected oligonucleotide sequence bound 3' thereto.

13. Particulate, functionalized magnetic porous glass having an unprotected oligonucleotide sequence bound thereto by a phosphodiester linkage.

14. A method for synthesizing an unprotected oligonucleotide sequence bound 3' to a spacer attached to an MPG particle support which comprises:
(i) providing magnetic porous glass having the schematic formula MPG—Si—O—R—Y, in which MPG is magnetic porous glass, R is a straight chain or cyclic spacer having 5 to 20 carbon, hydrogen or oxygen atoms, and Y is —CH$_2$OH or —NH$_2$;
wherein said spacer terminates in —CH$_2$OH or —NH$_2$;
(ii) subjecting said magnetic porous glass of step (i) to oligonucleotide synthesis conditions to produce said unprotected oligonucleotide sequence bound 3' to said spacer.

15. A method for isolating a known oligonucleotide sequence which comprises:
(i) providing an unprotected oligonucleotide sequence bound 3' to particulate magnetic porous glass
wherein said oligonucleotide sequence is complementary to said known oligonucleotide sequence;
(ii) subjecting said 3' bound unprotected oligonucleotide sequence of step (i) and said known oligonucleotide to hybridizing conditions;
(iii) subjecting the product of step (ii) to a magnetic field to separate the hybridization products, if any, formed in said step (ii).

* * * * *

SEQUENCE LISTING ( 1 ) GENERAL INFORMATION:

( i i i ) NUMBER OF SEQUENCES: 8

( 2 ) INFORMATION FOR SEQ ID NO: 1:

( i ) SEQUENCE CHARACTERISTICS:
        ( A ) LENGTH: 20
        ( B ) TYPE: Nucleotide
        ( C ) STRANDEDNESS: Single
        ( D ) TOPOLOGY: Unknown ( i x ) SEQUENCE DESCRIPTION: SEQ ID NO: 1:

```
ACCGCTGGGT TCTTTTACAA                                          20
```

( 2 ) INFORMATION FOR SEQ ID NO: 2:

( i ) SEQUENCE CHARACTERISTICS:
        ( A ) LENGTH: 17
        ( B ) TYPE: Nucleotide
        ( C ) STRANDEDNESS: Single
        ( D ) TOPOLOGY: Unknown ( i x ) SEQUENCE DESCRIPTION: SEQ ID NO: 2:

```
CATTTTGCTG CCGGTCA                                             17
```

( 2 ) INFORMATION FOR SEQ ID NO: 3:

( i ) SEQUENCE CHARACTERISTICS:
        ( A ) LENGTH: 17
        ( B ) TYPE: Nucleotide
        ( C ) STRANDEDNESS: Single
        ( D ) TOPOLOGY: Unknown (ix) SEQUENCE DESCRIPTION: SEQ ID NO: 3:

GTAAAACGAC GGCCAGT    17

(2) INFORMATION FOR SEQ ID NO: 4:

(i) SEQUENCE CHARACTERISTICS:
(A) LENGTH: 17
(B) TYPE: Nucleotide
(C) STRANDEDNESS: Single
(D) TOPOLOGY: Unknown (ix) SEQUENCE DESCRIPTION: SEQ ID NO: 4:

CATTTGCTG CCGGTCA    17

(2) INFORMATION FOR SEQ ID NO: 5:

(i) SEQUENCE CHARACTERISTICS:
(A) LENGTH: 17
(B) TYPE: Nucleotide
(C) STRANDEDNESS: Single
(D) TOPOLOGY: Unknown (ix) SEQUENCE DESCRIPTION: SEQ ID NO: 5:

GTAAAACGAC GGCCAGT    17

(2) INFORMATION FOR SEQ ID NO: 6:

(i) SEQUENCE CHARACTERISTICS:
(A) LENGTH: 34
(B) TYPE: Nucleotide
(C) STRANDEDNESS: Single
(D) TOPOLOGY: Unknown (ix) SEQUENCE DESCRIPTION: SEQ ID NO: 6:

CATTTGCTG CCGGTCAGTA AAACGACGGC CAGT    34

(2) INFORMATION FOR SEQ ID NO: 7:

(i) SEQUENCE CHARACTERISTICS:
(A) LENGTH: 17
(B) TYPE: Nucleotide
(C) STRANDEDNESS: Single
(D) TOPOLOGY: Unknown (ix) SEQUENCE DESCRIPTION: SEQ ID NO: 7:

CATTTGCTG CCGGTCA    17

(2) INFORMATION FOR SEQ ID NO: 8:

(i) SEQUENCE CHARACTERISTICS:
(A) LENGTH: 17
(B) TYPE: Nucleotide
(C) STRANDEDNESS: Single
(D) TOPOLOGY: Unknown (ix) SEQUENCE DESCRIPTION: SEQ ID NO: 8:

GTAAAACGAC GGCCAGT    17